(12) United States Patent
Sakamaki

(10) Patent No.: US 10,343,710 B2
(45) Date of Patent: Jul. 9, 2019

(54) VEHICLE STEERING SYSTEM

(71) Applicant: JTEKT CORPORATION, Osaka-shi, Osaka (JP)

(72) Inventor: Masahiko Sakamaki, Yao (JP)

(73) Assignee: JTEKT CORPORATION, Osaka-shi (JP)

( * ) Notice: Subject to any disclaimer, the term of this patent is extended or adjusted under 35 U.S.C. 154(b) by 73 days.

(21) Appl. No.: 15/607,748

(22) Filed: May 30, 2017

(65) Prior Publication Data

US 2017/0349204 A1 Dec. 7, 2017

(30) Foreign Application Priority Data

Jun. 7, 2016 (JP) .................................. 2016-113836

(51) Int. Cl.
*B62D 5/04* (2006.01)
*B62D 6/00* (2006.01)
*B62D 5/00* (2006.01)

(52) U.S. Cl.
CPC .............. *B62D 5/04* (2013.01); *B62D 5/005* (2013.01); *B62D 6/00* (2013.01); *B62D 5/003* (2013.01)

(58) Field of Classification Search
CPC . B62D 5/04; B62D 5/005; B62D 6/00; B62D 5/003
USPC ......................................................... 180/402
See application file for complete search history.

(56) References Cited

U.S. PATENT DOCUMENTS

| | | | |
|---|---|---|---|
| 2005/0082107 A1* | 4/2005 | Husain | B62D 5/005 180/402 |
| 2014/0343791 A1* | 11/2014 | Suzuki | B62D 5/0469 701/41 |
| 2015/0291208 A1 | 10/2015 | Miyasaka | |
| 2016/0159388 A1* | 6/2016 | Sekiya | B62D 5/0409 180/446 |
| 2017/0106900 A1* | 4/2017 | Sakai | B62D 5/0421 |
| 2018/0080426 A1* | 3/2018 | Kuramochi | F02N 11/0822 11/822 |

FOREIGN PATENT DOCUMENTS

JP 2001-171543 A 6/2001

OTHER PUBLICATIONS

Oct. 16, 2017 Extended Search Report issued in European Patent Application No. 17173943.6.

* cited by examiner

*Primary Examiner* — Jacob D Knutson
(74) *Attorney, Agent, or Firm* — Oliff PLC

(57) ABSTRACT

A vehicle steering system includes a clutch provided on a power transmission path extending from a steering wheel to steered wheels, a reactive-torque motor configured to apply a steering reactive torque to the steering wheel, a steering operation motor configured to steer the steered wheels, and a clutch engagement controller configured to engage the clutch when a steered angle of the steered wheels has reached a steered angle limit value and the steering wheel is rotated by an amount equal to or greater than a first prescribed value in a direction opposite to a direction toward a steering neutral position, with respect to a first steering angle that is a steering angle of the steering wheel at a time when the steered angle reaches the steered angle limit value, in a case where the clutch is in a disengaged state.

7 Claims, 6 Drawing Sheets

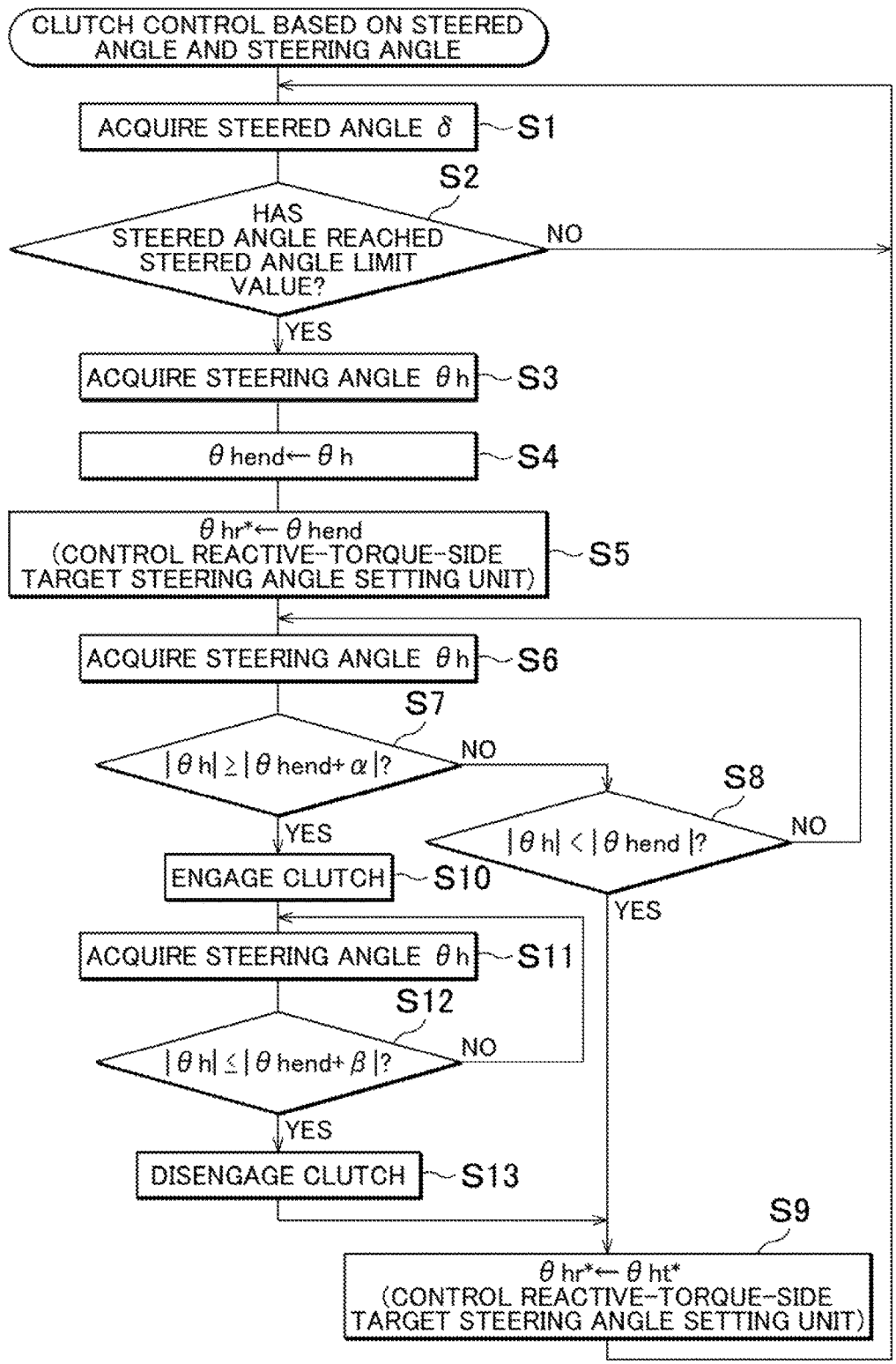

VEHICLE STEERING SYSTEM

INCORPORATION BY REFERENCE

The disclosure of Japanese Patent Application No. 2016-113836 filed on Jun. 7, 2016 including the specification, drawings and abstract is incorporated herein by reference in its entirety.

BACKGROUND OF THE INVENTION

1. Field of the Invention

The invention relates to a vehicle steering system configured such that a steering operation mechanism is driven by a steering operation motor in a state where a steering member to be operated for steering and the steering operation mechanism are not mechanically connected to each other.

2. Description of the Related Art

A so-called steer-by-wire-type vehicle steering system in which a steering member and a steering operation mechanism are not mechanically connected to each other is known as a vehicle steering system. For example, Japanese Patent Application Publication No. 2001-171543 (JP 2001-171543 A) describes a steer-by-wire-type vehicle steering system configured such that a steering wheel, which serves as a steering member, and a steering operation mechanism can be mechanically connected to each other via a clutch. At normal times, the clutch is in a disengaged state, and steering control is executed in a steer-by-wire mode. When some sort of malfunction occurs while the steering control is being executed in the steer-by-wire mode, the clutch is engaged and steering control is executed in a power steering mode. When a rack shaft reaches a movable end while the steering control is being executed in the steer-by-wire mode, the clutch is engaged. Thus, even when a driver attempts to further rotate the steering wheel in a steering direction in which the steering angle increases, rotation of the steering wheel is suppressed because the rack shaft comes into contact with a stopper. Then, when the rack shaft moves away from the movable end, the clutch is disengaged.

In the vehicle steering system described in JP 2001-171543 A, the clutch is engaged each time the rack shaft reaches the movable end, resulting in an increase in the frequency with which the clutch is engaged. This increases the frequency with which operating noise of the clutch is generated, and reduces the durability of the clutch. In contrast to this, there is a known method in which, when a rack shaft reaches a movable end, further rotation of a steering wheel is stopped by using a reactive torque that is applied to the steering wheel by a reactive-torque motor, without engaging a clutch.

With this method, the clutch is not engaged, and thus operating noise of the clutch is not generated and reduction in the durability of the clutch is suppressed. However, for example, when a driver steers the steering wheel while applying his/her weight to the steering wheel, a steering torque that is much higher than that in normal steering may be applied to the steering wheel. In this case, when the steering torque is higher than a torque for stopping the rotation of the steering wheel, which is applied by the reactive-torque motor, the steering wheel rotates. Then, only the steering wheel is rotated although steered wheels are not turned, and thus the correspondence relationship between the steered angle of the steered wheels and the steering angle of the steering wheel is not appropriately maintained. In this state, when the steering wheel is returned to the neutral position, the straight traveling position of the steered wheels and the neutral position of the steering wheel do not appropriately correspond to each other. This causes a possibility that the steered wheels will not be in the straight traveling position although the steering wheel is returned to the neutral position, that is, the position at which a vehicle is supposed to travel straight.

SUMMARY OF THE INVENTION

One object of the invention is to provide a vehicle steering system configured to reduce the frequency with which a clutch is engaged in order to suppress rotation of a steering member.

A vehicle steering system according to an aspect of the invention includes: a steering member, a steering operation mechanism, a clutch, a reactive-torque motor, a steering operation motor, and a clutch engagement controller. The steering member is configured to steer a vehicle. The steering operation mechanism is configured to steer steered wheels. The clutch is provided on a power transmission path extending from the steering member to the steered wheels. The reactive-torque motor is connected to a portion of the power transmission path. The portion of the power transmission path to which the reactive-torque motor is connected is closer to the steering member than the clutch is. The reactive-torque motor is configured to apply a steering reactive torque to the steering member. The steering operation motor is connected to a portion of the power transmission path. The portion of the power transmission path to which the steering operation motor is connected is closer to the steered wheels than the clutch is. The steering operation motor is configured to steer the steered wheels. The clutch engagement controller is configured to engage the clutch when a steered angle of the steered wheels has reached a steered angle limit value and the steering member is rotated by an amount equal to or greater than a first prescribed value in a direction opposite to a direction toward a steering neutral position, with respect to a first steering angle that is a steering angle of the steering member at a time when the steered angle reaches the steered angle limit value, in a case where the clutch is in a disengaged state.

With this configuration, the clutch is engaged when the steering member is rotated by an amount equal to or greater than the first prescribed value in a steering direction in which the steering angle increases, against an operation reactive torque applied by the reactive-torque motor, after the steered angle reaches the steered angle limit value. Thus, the frequency with which the clutch is engaged is lower than that in the related art described in JP 2001-171543 A in which the clutch is engaged each time the rack shaft reaches the movable end. Thus, it is possible to reduce the frequency with which operating noise of the clutch is generated, and to increase the durability of the clutch.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 6 is a flowchart for describing clutch control executed by a clutch controller based on a steered angle and a steering angle.

DETAILED DESCRIPTION OF EMBODIMENTS

Figure 1:
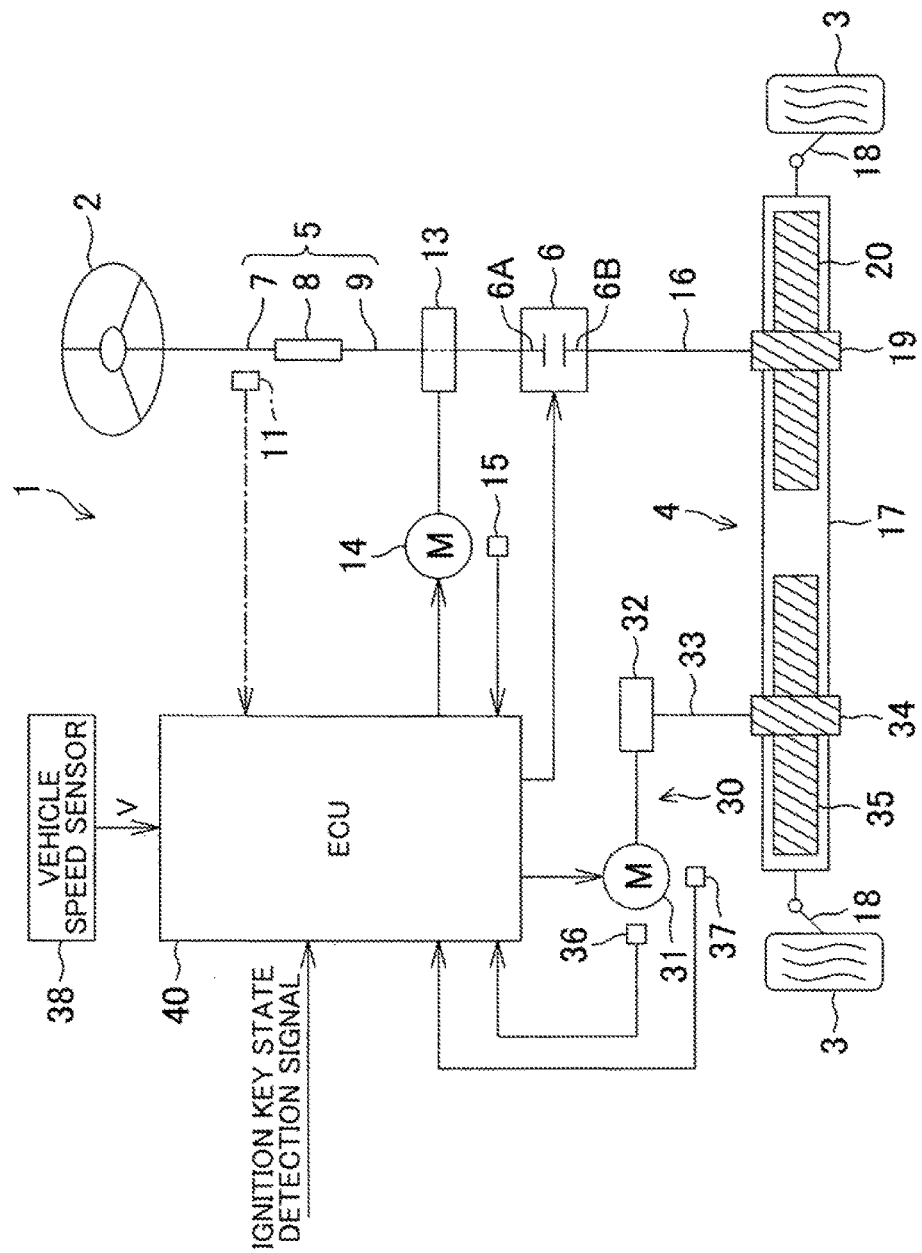
FIG. 1 is a diagram illustrating the configuration of a vehicle steering system according to an embodiment of the invention.

Hereinafter, embodiments of the invention will be described in detail with reference to the accompanying drawings. FIG. 1 is a diagram illustrating the schematic configuration of a vehicle steering system according to an embodiment of the invention. A vehicle steering system 1 includes a steering wheel 2, which serves as a steering member configured to steer a vehicle, a steering operation mechanism 4 configured to steer steered wheels 3, a steering shaft 5 connected to the steering wheel 2, and a clutch 6 configured to mechanically connect the steering shaft 5 or the steering wheel 2 to the steering operation mechanism 4, and to disconnect the steering shaft 5 or the steering wheel 2 from the steering operation mechanism 4. In the present embodiment, the clutch 6 is an electromagnetic clutch. The clutch 6 includes an input shaft 6A and an output shaft 6B, and has the function of allowing and interrupting torque transmission between the input shaft 6A and the output shaft 6B.

The steering shaft 5 includes a first shaft 7 connected to the steering wheel 2, a second shaft 9 connected to the input shaft 6A of the clutch 6 in an integrated manner, and a torsion bar 8 that connects the first shaft 7 to the second shaft 9. A reactive-torque motor 14 is connected to the second shaft 9 via a speed reducer 13. The reactive-torque motor 14 is an electric motor that applies a steering reactive torque (torque in a direction opposite to the steering direction) to the steering wheel 2. The speed reducer 13 is a worm gear mechanism including a worm shaft (not illustrated) rotatably connected to an output shaft of the reactive-torque motor 14 in an integrated manner, and a worm wheel (not illustrated) meshed with the worm shaft and rotatably connected to the second shaft 9 in an integrated manner. The reactive-torque motor 14 is provided with a rotation angle sensor 15 configured to detect a rotation angle of the reactive-torque motor 14.

The steering operation mechanism 4 includes a first pinion shaft 16 connected to the output shaft 6B of the clutch 6 in an integrated manner, a rack shaft 17 serving as a steered shaft, and a steering operation actuator 30 configured to apply a steering force to the rack shaft 17. The steered wheels 3 are connected to respective end portions of the rack shaft 17 via tie rods 18 and knuckle arms (not illustrated). A first pinion 19 is connected to a distal end of the first pinion shaft 16. The rack shaft 17 extends linearly in the right-left direction of the vehicle. A first rack 20 meshed with the first pinion 19 is provided at a first end portion of the rack shaft 17 in its axial direction.

The steering operation actuator 30 includes a steering operation motor 31, a speed reducer 32, a second pinion shaft 33, a second pinion 34, and a second rack 35. The second pinion shaft 33 is provided separately from the steering shaft 5. The speed reducer 32 is a worm gear mechanism including a worm shaft (not illustrated) rotatably connected to an output shaft of the steering operation motor 31, and a worm wheel (not illustrated) meshed with the worm shaft and rotatably connected to the second pinion shaft 33 in an integrated manner.

The second pinion 34 is connected to a distal end of the second pinion shaft 33. The second rack 35 is provided at a second end portion of the rack shaft 17, which is on a side opposite to the first end portion in the axial direction. The second pinion 34 is meshed with the second rack 35. The steering operation motor 31 is provided with a rotation angle sensor 36 configured to detect a rotation angle of the steering operation motor 31. A stroke sensor (hereinafter, referred to as "steered angle sensor") 37 configured to detect a travel distance of the rack shaft 17 in its axial direction is disposed in the vicinity of the rack shaft 17. A steered angle δ of the steered wheels 3 is detected based on the travel distance of the rack shaft 17 in its axial direction, which is detected by the steered angle sensor 37.

Detection signals from the rotation angle sensors 15, 36, the steered angle sensor 37, and a vehicle speed sensor 38, and an ignition key state detection signal are input into an electronic control unit (ECU) 40. The ECU 40 controls the clutch 6, the reactive-torque motor 14, and the steering operation motor 31 based on the input signals. The vehicle steering system 1 has a steer-by-wire mode, a failsafe mode, and so forth, as operation modes. In the steer-by-wire mode, steering of the steered wheels 3 is performed in a state where the steering wheel 2 and the steering operation mechanism 4 are not mechanically connected to each other (in a state where the clutch 6 is disengaged). In the failsafe mode, steering of the steered wheels 3 is performed in a state where the steering wheel 2 and the steering operation mechanism 4 are mechanically connected to each other (in a state where the clutch 6 is engaged). The failsafe mode is a mode that is set automatically when some sort of malfunction occurs in the steer-by-wire mode. The failsafe mode may be a manual steering mode in which steering is performed only through a manual operation, or may be a power steering mode in which a steering assist force corresponding to a steering torque or the like is generated by at least one of the reactive-torque motor 14 and the steering operation motor 31.

Figure 2:
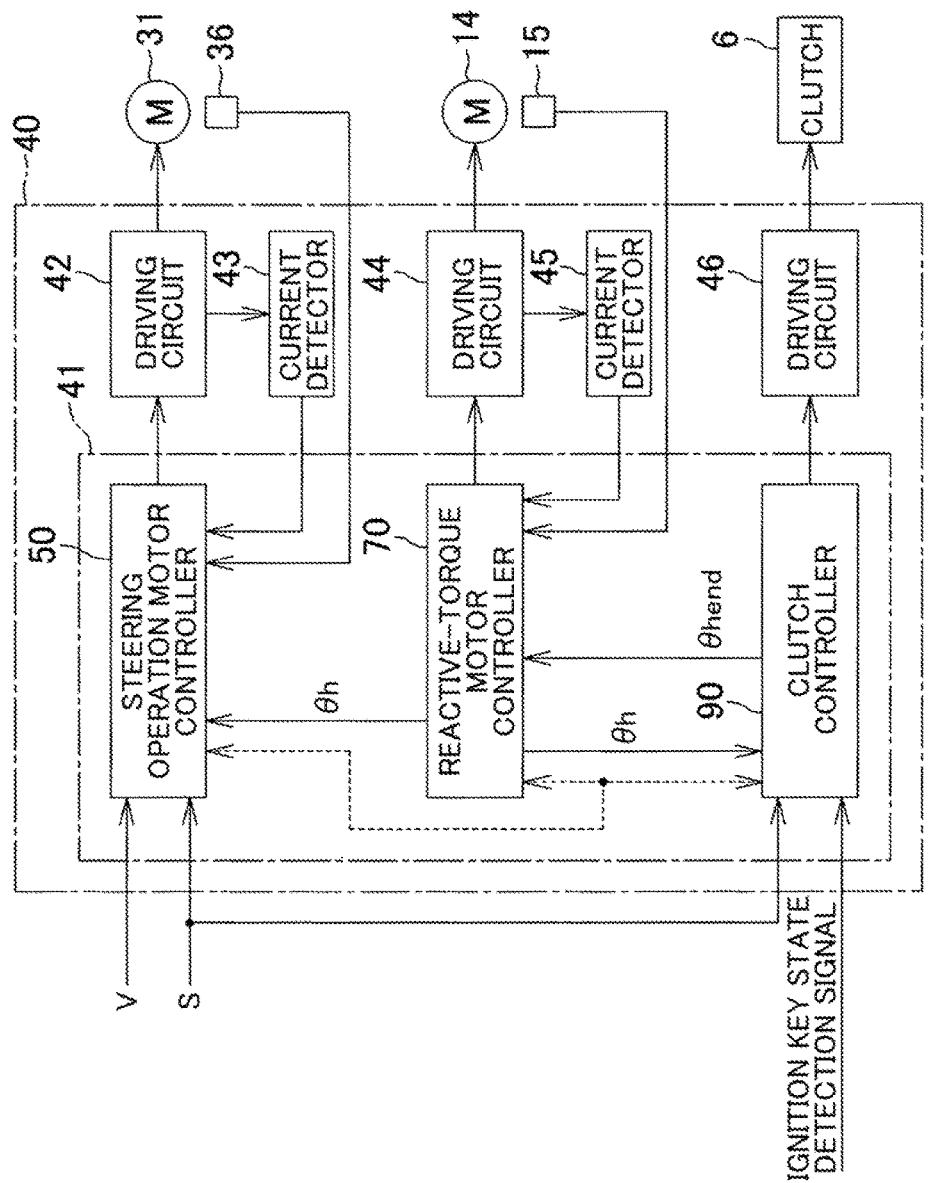
FIG. 2 is a block diagram illustrating the electrical configuration of an electronic control unit (ECU)

As described later, in the present embodiment, the clutch 6 may be engaged in order to suppress the rotation of the steering wheel 2 even when no malfunction has occurred in the steer-by-wire mode. FIG. 2 is a block diagram illustrating the electrical configuration of the ECU 40. The ECU 40 includes a microcomputer 41, a driving circuit (inverter circuit) 42 configured to supply electric power to the steering operation motor 31 under the control executed by the microcomputer 41, a current detector 43 configured to detect a motor current passing through the steering operation motor 31, a driving circuit (inverter circuit) 44 configured to supply electric power to the reactive-torque motor 14 under the control executed by the microcomputer 41, and a current detector 45 configured to detect a motor current passing through the reactive-torque motor 14. The ECU 40 further includes a driving circuit 46 configured to drive the clutch 6 under the control executed by the microcomputer 41.

The microcomputer 41 includes a central processing unit (CPU), and memories (e.g. a read-only storage unit (ROM), a random-access storage unit (RAM), and a nonvolatile storage unit), and functions as a plurality of function processing units by executing prescribed programs. The function processing units include a steering operation motor controller 50 configured to control the steering operation motor 31, a reactive-torque motor controller 70 configured to control the reactive-torque motor 14, and a clutch controller 90 configured to control the clutch 6.

The clutch 6 is, for example, usually in an engaged state, and enters a disengaged state when energized. When the ignition key is operated to an on-position, the clutch controller 90 places the clutch 6 into the disengaged state. When the ignition key is operated from the on-position to an off-position, the clutch controller 90 places the clutch 6 into the engaged state. When some sort of malfunction occurs in the steer-by-wire mode, the clutch controller 90 places the clutch 6 into the engaged state.

The clutch controller 90 executes control for engaging or disengaging the clutch 6 based on a steered angle δ detected by the steered angle sensor 37, and a steering angle θh provided from the reactive-torque motor controller 70 (hereinafter referred to as "clutch control based on the steered angle and the steering angle" where appropriate). In the present embodiment, the steering angle θh is a rotation angle of the second shaft 9. The clutch control based on the steered angle and the steering angle will be described below in detail.

The steering operation motor controller 50 controls the driving circuit 42 based on a steering angle θh provided from the reactive-torque motor controller 70, a vehicle speed V detected by the vehicle speed sensor 38, a steered angle δ detected by the steered angle sensor 37, an output signal from the rotation angle sensor 36, and a current detected by the current detector 43. Thus, the steering operation motor controller 50 achieves steering control corresponding to a steering state.

Figure 3:
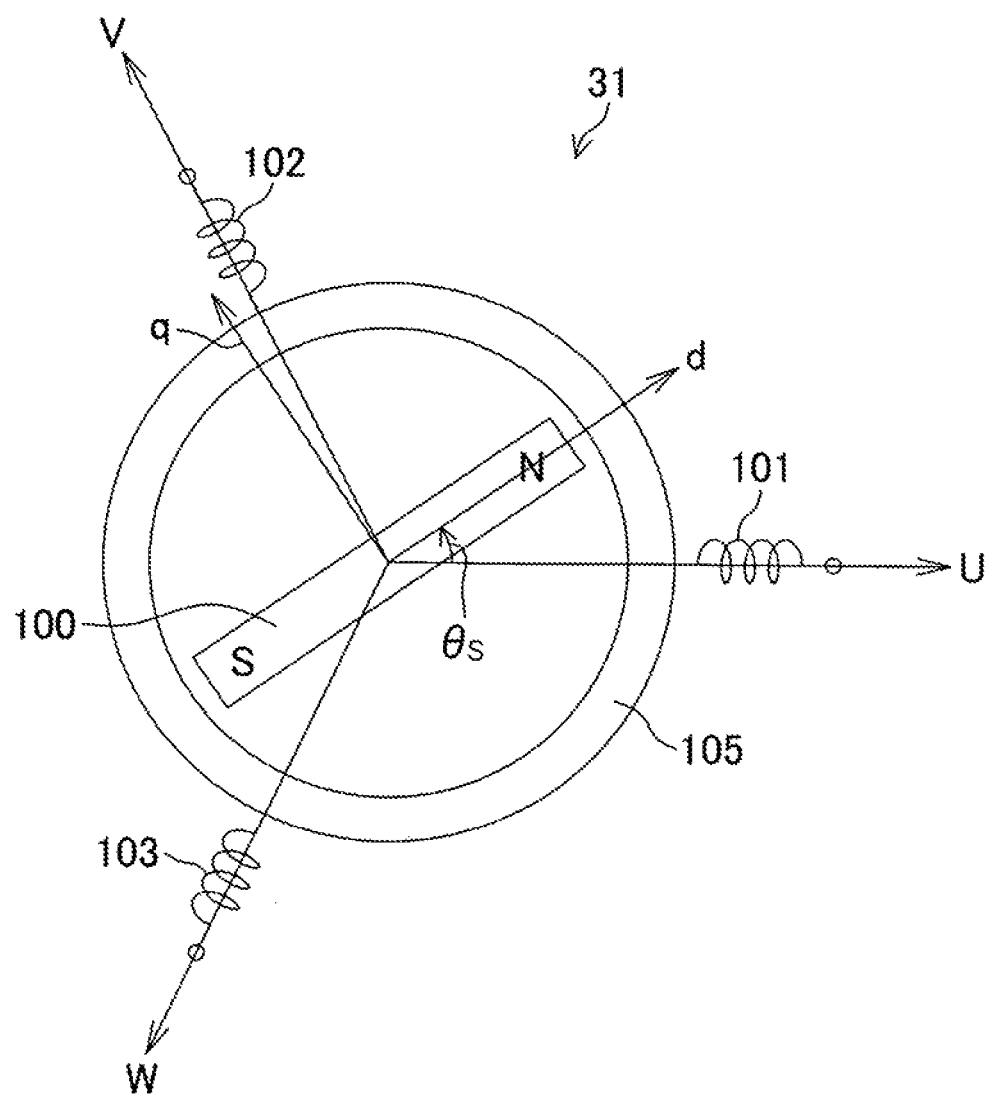
FIG. 3 is a diagram illustrating the configuration of a steering operation motor.

The reactive-torque motor controller 70 controls the driving circuit 44 based on a steered-side target steering angle θht* provided from the steering operation motor controller 50, an output signal from the rotation angle sensor 15, and a current detected by the current detector 45. Thus, the reactive-torque motor controller 70 achieves reactive torque control corresponding to a steering state. The steering operation motor 31 is, for example, a three-phase brushless motor. The steering operation motor 31 includes a rotor 100 as field magnet, and a stator 105 provided with a U-phase stator coil 101, a V-phase stator coil 102, and a W-phase coil 103, as schematically illustrated in FIG. 3. The steering operation motor 31 may be an inner-rotor motor in which a stator is disposed outside a rotor so as to face the rotor, or may be an outer-rotor motor in which a stator is disposed inside a cylindrical rotor so as to face the cylindrical rotor.

Three-phase fixed coordinates (a UVW coordinate system) are defined. In the three-phase fixed coordinates, a U-axis, a V-axis, and a W-axis are defined so as to extend respectively in the directions of the U-phase stator coil 101, the V-phase stator coil 102, and the W-phase coil 103. Further, a two-phase rotational coordinate system (a dq coordinate system; an actual rotational coordinate system) is defined. In the two-phase rotational coordinate system, a d-axis (a magnetic pole axis) is defined so as to extend in the direction of a magnetic pole of the rotor 100 and a q-axis (a torque axis) is defined so as to extend in a direction perpendicular to the d-axis in a rotation plane of the rotor 100. The dq coordinate system is a rotational coordinate system that rotates together with the rotor 100. In the dq coordinate system, only the q-axis current contributes to torque generation of the rotor 100, and therefore the d-axis current is set to zero and the q-axis current is controlled based on a desired torque. The rotation angle (rotor angle (electrical angle)) θs of the rotor 100 is a rotation angle of the d-axis with respect to the U-axis. The dq coordinate system is an actual rotational coordinate system according to the rotor angle θs. Using the rotor angle θs allows execution of coordinate transformation between the UVW coordinate system and the dq coordinate system. The reactive-torque motor 14 is, for example, a three-phase brushless motor. The reactive-torque motor 14 has the same structure as that of the steering operation motor 31.

Figure 4:
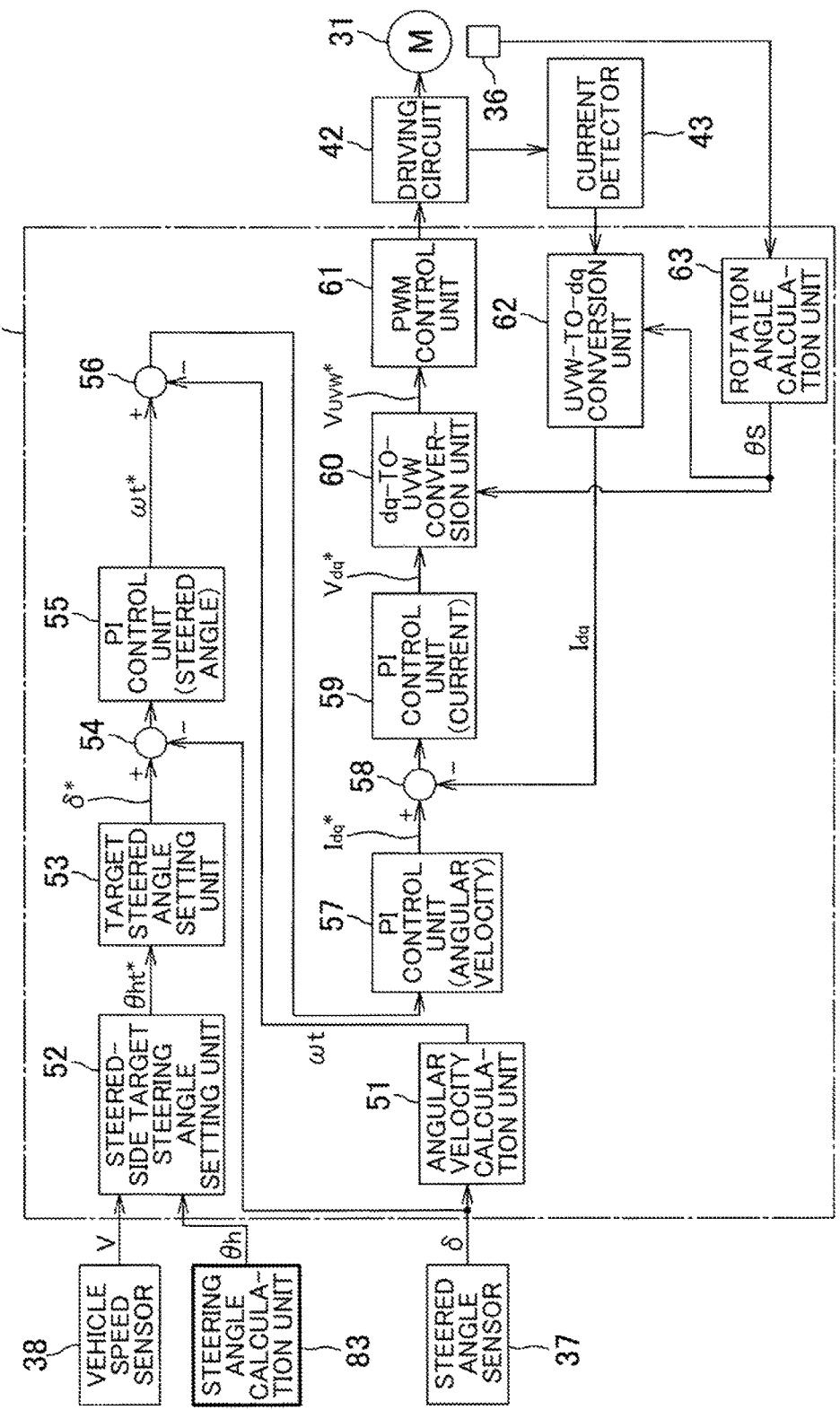
FIG. 4 is a block diagram illustrating an example of the configuration of a steering operation motor controller.

FIG. 4 is a block diagram illustrating an example of the configuration of the steering operation motor controller 50. The steering operation motor controller 50 includes an angular velocity calculation unit 51, a steered-side target steering angle setting unit 52, a target steered angle setting unit 53, an angle deviation calculation unit 54, a proportional-integral (PI) control unit 55, an angular velocity deviation calculation unit 56, a PI control unit 57, a current deviation calculation unit 58, a PI control unit 59, a dq-to-UVW conversion unit 60, a pulse width modulation (PWM) control unit 61, a UVW-to-dq conversion unit 62, and a rotation angle calculation unit 63.

The steered-side target steering angle setting unit 52 calculates a steered-side target steering angle θht*, which is a target value of the rotation angle (the steering angle) of the steering wheel 2, based on the steering angle θh (the rotation angle of the second shaft 9) calculated by the steering angle calculation unit 83 (see FIG. 5) in the reactive-torque motor controller 70 and the vehicle speed V detected by the vehicle speed sensor 38. For example, the steered-side target steering angle setting unit 52 sets the steered-side target steering angle θht* based on the vehicle speed V and the steering angle θh, by using a prescribed transfer function. That is, the steered-side target steering angle setting unit 52 sets the steered-side target steering angle θht* based on a detection value (a steering state detection value) indicating a steering state.

The target steered angle setting unit 53 sets a target steered angle δ*, which is a target value of the steered angle, based on the steered-side target steering angle θht* set by the steered-side target steering angle setting unit 52. The target steered angle δ* set by the target steered angle setting unit 53 is provided to the angle deviation calculation unit 54. The angle deviation calculation unit 54 calculates a deviation Δδ (=δ*−δ) between the target steered angle δ* set by the target steered angle setting unit 53 and the steered angle δ detected by the steered angle sensor 37.

The PI control unit 55 calculates a target steered angular velocity ωt*, which is a target value of the steered angular velocity, by executing PI calculation on the angle deviation Δδ calculated by the angle deviation calculation unit 54. The target steered angular velocity ωt* calculated by the PI control unit 55 is provided to the angular velocity deviation calculation unit 56. The angular velocity calculation unit 51 calculates an angular velocity (steered angular velocity) ωt of the steered angle δ by executing time-differentiation on the steered angle δ detected by the steered angle sensor 37. The steered angular velocity δt calculated by the angular velocity calculation unit 51 is provided to the angular velocity deviation calculation unit 56.

The angular velocity deviation calculation unit 56 calculates a deviation Δωt (=ωt*−ωt) between the target steered angular velocity ωt* calculated by the PI control unit 55 and the steered angular velocity ωt calculated by the angular velocity calculation unit 51. The PI control unit 57 calculates a target current, which is a target value of a current that is to be passed through each coordinate axis of the dq coordinate system, by executing PI calculation on the angular velocity deviation Δωt calculated by the angular velocity deviation calculation unit 56. Specifically, the PI control unit 57 calculates a target d-axis current Id* and a target q-axis current Iq* (hereinafter, collectively referred to as "target two-phase current Idq*" where appropriate). More specifically, the PI control unit 57 calculates the target q-axis current Iq* as a significant value, and sets the target d-axis current Id* to zero. The target two-phase current Idq* calculated by the PI control unit 57 is provided to the current deviation calculation unit 58.

The rotation angle calculation unit 63 calculates a rotation angle (electrical angle; hereinafter referred to as "rotor angle θs") of the rotor of the steering operation motor 31 based on an output signal from the rotation angle sensor 36. The current detector 43 detects a U-phase current IU, a V-phase current IV, and a W-phase current IW (hereinafter, collectively referred to as "three-phase detection current IUVW" where appropriate) of the steering operation motor 31. The three-phase detection current IUVW detected by the current detector 43 is provided to the UVW-to-dq conversion unit 62.

The UVW-to-dq conversion unit 62 converts the three-phase detection current IUVW (U-phase current IU, V-phase current IV, and W-phase current IW) in the UVW coordinate system detected by the current detector 43, into two-phase detection currents Id, Iq (hereinafter, collectively referred to as "two-phase detection current Idq" where appropriate) in the dq coordinate system. The two-phase detection currents Id, Iq are provided to the current deviation calculation unit 58. For the coordinate transformation in the UVW-to-dq conversion unit 62, the rotor angle θs calculated by the rotation angle calculation unit 63 is used.

The current deviation calculation unit 58 calculates a deviation between the target two-phase current Idq* calculated by the PI control unit 57 and the two-phase detection current Idq provided from the UVW-to-dq conversion unit 62. More specifically, the current deviation calculation unit 58 calculates a deviation of the d-axis detection current Id from the target d-axis current Id*, and a deviation of the q-axis detection current Iq from the target q-axis current Iq*. These deviations are provided to the PI control unit 59.

The PI control unit 59 generates a target two-phase voltage Vdq* (a target d-axis voltage Vd* and a target q-axis voltage Vq*) to be applied to the steering operation motor 31, by executing the PI calculation on the current deviation calculated by the current deviation calculation unit 58. The target two-phase voltage Vdq* is provided to the dq-to-UVW conversion unit 60. The dq-to-UVW conversion unit 60 converts the target two-phase voltage Vdq* to a target three-phase voltage VUVW*. For this coordinate transformation, the rotor angle θs calculated by the rotation angle calculation unit 63 is used. The target three-phase voltage VUVW* includes a target U-phase voltage VU*, a target V-phase voltage VV*, and a target W-phase voltage VW*. The target three-phase voltage VUVW* is provided to the PWM control unit 61.

The PWM control unit 61 generates a U-phase PWM control signal, a V-phase PWM control signal, and a W-phase PWM control signal respectively having duty ratios corresponding to the target U-phase voltage VU*, the target V-phase voltage VV*, and the target W-phase voltage VW*, and the supplies the U-phase PWM control signal, the V-phase PWM control signal, and the W-phase PWM control signal to the driving circuit 42. The driving circuit 42 is an inverter circuit with three phases corresponding to the U phase, the V phase, and the W phase. Power devices constituting the inverter circuit are controlled by the PWM control signals provided from the PWM control unit 61, so that voltages corresponding to the target three-phase voltage VUVW* are applied to the U-phase stator coil 101, the V-phase stator coil 102, and the W-phase coil 103 of the steering operation motor 31.

The angle deviation calculation unit 54 and the PI control unit 55 constitute an angle feedback controller. Through the operation of the angle feedback controller, the steered angle δ of the steered wheels 3 is controlled so as to approach the target steered angle δ* set by the target steered angle setting unit 53. The angular velocity deviation calculation unit 56 and the PI control unit 57 constitute an angular velocity feedback controller. Through the operation of the angular velocity feedback controller, the steered angular velocity ωt is controlled so as to approach the target steered angular velocity ωt* calculated by the PI control unit 55. The current deviation calculation unit 58 and the PI control unit 59 constitute a current feedback controller. Through the operation of the current feedback controller, a motor current flowing through the steering operation motor 31 is controlled so as to approach the target two-phase current Idq* calculated by the PI control unit 57.

Figure 5:
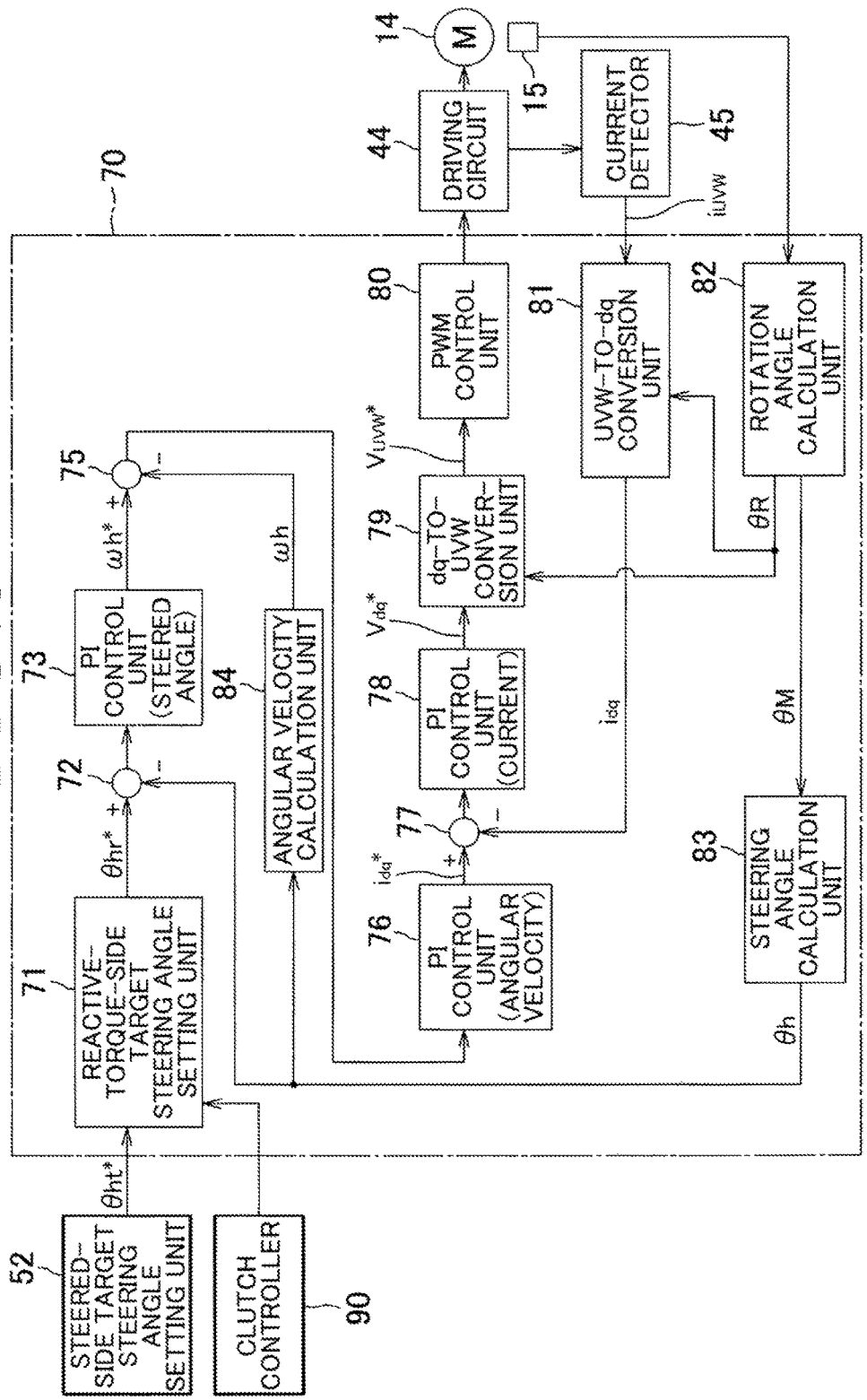
FIG. 5 is a block diagram illustrating an example of the configuration of a reactive-torque motor controller.

FIG. 5 is a block diagram illustrating an example of the configuration of the reactive-torque motor controller 70. The reactive-torque motor controller 70 includes a reactive-torque-side target steering angle setting unit 71, an angle deviation calculation unit 72, a PI control unit 73, an angular velocity deviation calculation unit 75, a PI control unit 76, a current deviation calculation unit 77, a PI control unit 78, a dq-to-UVW conversion unit 79, a PWM control unit 80, a UVW-to-dq conversion unit 81, a rotation angle calculation unit 82, a steering angle calculation unit 83, and an angular velocity calculation unit 84.

The rotation angle calculation unit 82 calculates an electrical angle θR and a mechanical angle θM of the rotor of the reactive-torque motor 14, based on an output signal from the rotation angle sensor 15. The steering angle calculation unit 83 calculates the steering angle θh by dividing the mechanical angle θM of the rotor of the reactive-torque motor 14 by a reduction ratio of the speed reducer 13. In the present embodiment, the steering angle calculation unit 83 calculates an amount of rotation (rotation angle) of the second shaft 9 in each of the forward and reverse directions from the neutral position (reference position) of the second shaft 9. The steering angle calculation unit 83 outputs the amount of rotation of the second shaft 9 to the right from the neutral position as, for example, a positive value, and outputs the amount of rotation of the second shaft 9 to the left from the neutral position as, for example, a negative value.

When the steered angle has not reached the steered angle limit value, the reactive-torque-side target steering angle setting unit 71 sets a reactive-torque-side target steering angle θht*, which is a target value of the rotation angle of the second shaft 9, based on the steered-side target steering angle θhr* set by the steered-side target steering angle setting unit 52 in the steering operation motor controller 50. In the present embodiment, the reactive-torque-side target steering angle setting unit 71 sets the steered-side target steering angle θht* set by the steered-side target steering angle setting unit 52, as the reactive-torque-side target steering angle θhr*.

On the other hand, when the steered angle has reached the steered angle limit value, the reactive-torque-side target steering angle setting unit 71 sets a steering angle θhend at the steered angle limit value provided from the clutch controller 90, as the reactive-torque-side target steering angle θhr*. Such switching of the reactive-torque-side target steering angle θhr* is executed based on a command from the clutch controller 90. The angle deviation calculation unit 72 calculates a deviation Δθh (=θhr*−θh) between the reactive-torque-side target steering angle θhr* set by the reactive-torque-side target steering angle setting unit 71 and the steering angle θh calculated by the steering angle calculation unit 83.

The PI control unit 73 calculates a target steering angular velocity ωh*, which is a target value of the steering angular velocity, by executing PI calculation on the angle deviation Δθh calculated by the angle deviation calculation unit 72. The target steering angular velocity ωh* calculated by the PI control unit 73 is provided to the angular velocity deviation calculation unit 75. The angular velocity calculation unit 84 calculates an angular velocity (steering angular velocity) ωh of the steering angle θh by executing time-differentiation on the steering angle θh calculated by the steering angle calculation unit 83. The steering angular velocity ωh calculated by the angular velocity calculation unit 84 is provided to the angular velocity deviation calculation unit 75.

The angular velocity deviation calculation unit 75 calculates a deviation Δωh (=ωh*−ωh) between the target steering angular velocity ωh* calculated by the PI control unit 73 and the steering angular velocity ωh calculated by the angular velocity calculation unit 84. The PI control unit 76 calculates a target current, which is a target value of a current that is to be passed through each coordinate axis of the dq coordinate system, by executing PI calculation on the angular velocity deviation Δωt calculated by the angular velocity deviation calculation unit 75. Specifically, the PI control unit 76 calculates a target d-axis current id* and a target q-axis current iq* (hereinafter, collectively referred to as "target two-phase current idq*" where appropriate). More specifically, the PI control unit 76 calculates the target q-axis current iq* as a significant value, and sets the target d-axis current id* to zero. The target two-phase current idq* calculated by the PI control unit 76 is provided to the current deviation calculation unit 77.

The current detector 45 detects a U-phase current iU, a V-phase current iV, and a W-phase current iW (hereinafter, collectively referred to as "three-phase detection current iUVW" where appropriate) of the reactive-torque motor 14. The three-phase detection current iUVW detected by the current detector 45 is provided to the UVW-to-dq conversion unit 81. The UVW-to-dq conversion unit 81 converts the three-phase detection current iUVW (the U-phase current iU, the V-phase current iV, and the W-phase current iW) in the UVW coordinate system detected by the current detector 45 into two-phase detection currents id, iq (hereinafter, collectively referred to as "two-phase detection current idq" where appropriate) of the dq coordinate system. The two-phase detection currents id, iq are provided to the current deviation calculation unit 77. For the coordinate transformation in the UVW-to-dq conversion unit 81, the electrical angle θR calculated by the rotation angle calculation unit 82 is used.

The current deviation calculation unit 77 calculates a deviation between the target two-phase current idq* output from the PI control unit 76 and the two-phase detection current idq provided from the UVW-to-dq conversion unit 81. More specifically, the current deviation calculation unit 77 calculates a deviation of the d-axis detection current id from the target d-axis current id* and a deviation of the q-axis detection current iq from the target q-axis current iq*. These deviations are provided to the PI control unit 78.

The PI control unit 78 generates a target two-phase voltage vdq* (a target d-axis voltage vd* and a target q-axis voltage vq*) to be applied to the reactive-torque motor 14, by executing PI calculation on the current deviation calculated by the current deviation calculation unit 77. The target two-phase voltage vdq* is provided to the dq-to-UVW conversion unit 79. The dq-to-UVW conversion unit 79 converts the target two-phase voltage vdq* to the target three-phase voltage vUVW*. For this coordinate transformation, the electrical angle θR calculated by the rotation angle calculation unit 82 is used. The target three-phase voltage vUVW* includes a target U-phase voltage vU*, a target V-phase voltage vV*, and a target W-phase voltage vW*. The target three-phase voltage vUVW* is provided to the PWM control unit 80.

The PWM control unit 80 generates a U-phase PWM control signal, a V-phase PWM control signal, and a W-phase PWM control signal respectively having duty ratios corresponding to the target U-phase voltage vU*, the target V-phase voltage vV*, and the target W-phase voltage vW*, and supplies the U-phase PWM control signal, the V-phase PWM control signal, and the W-phase PWM control signal to the driving circuit 44. The driving circuit 44 is an inverter circuit with three phases corresponding to the U-phase, the V-phase, and the W-phase. Power devices constituting the inverter circuit are controlled by the PWM control signals provided from the PWM control unit 80, so that a voltage corresponding to the target three-phase voltage vUVW* is applied to each phase stator coil of the reactive-torque motor 14.

The angle deviation calculation unit 72 and the PI control unit 73 constitute an angle feedback controller. Through the operation of the angle feedback controller, the steering angle θh is controlled so as to approach the reactive-torque-side target steering angle θhr* that is set by the reactive-torque-side target steering angle setting unit 71. The angular velocity deviation calculation unit 75 and the PI control unit 76 constitute an angular velocity feedback controller. Through the operation of the angular velocity feedback controller, the steering angular velocity ωh is controlled so as to approach the target steering angular velocity ωh* that is calculated by the PI control unit 73. The current deviation calculation unit 77 and the PI control unit 78 constitute a current feedback controller. Through the operation of the current feedback controller, a motor current flowing through the reactive-torque motor 14 is controlled so as to approach the target two-phase current Idq* output from the PI control unit 76.

FIG. 6 is a flowchart for describing clutch control executed by the clutch controller 90 based on a steered angle and a steering angle. The clutch controller 90 acquires the steered angle δ detected by the steered angle sensor 37 (step S1). The clutch controller 90 determines whether or not the steered angle δ has reached the steered angle limit value (step S2). The steered angle limit value is a steered angle substantially corresponding to a position at which the rack shaft 17 comes into contact with a rack stopper (not illustrated). There are a limit value δRend (δRend>0) in a rightward steering direction, and a limit value δLend (δLend<0) in a leftward steering direction. When the steered angle δ is equal to or greater than δRend or when the steered angle δ is equal to or smaller than δLend, the clutch controller 90 determines that the steered angle δ has reached the steered angle limit value.

When the clutch controller 90 determines that the steered angle δ has not reached the steered angle limit value (step S2: NO), the clutch controller 90 returns to step S1. When the clutch controller 90 determines in step S2 that the steered angle δ has reached the steered angle limit value (step S2: YES), the clutch controller 90 acquires the steering angle θh calculated by the steering angle calculation unit 83 (step S3). The clutch controller 90 stores the acquired steering angle θh in a storage unit (not illustrated) as the steering angle θhend at the steered angle limit value (step S4).

Then, the clutch controller 90 provides the steering angle θhend at the steered angle limit value stored in step S4 to the reactive-torque-side target steering angle setting unit 71, and controls the reactive-torque-side target steering angle setting unit 71 such that the steering angle θhend is set as the reactive-torque-side target steering angle θhr* (step S5). Thus, the rotation angle of the reactive-torque motor 14 is controlled so as to coincide with the steering angle θhend corresponding to the steered angle limit value. That is, the steering wheel 2 is controlled to be fixed at the position corresponding to the steered angle limit value irrespective of a torsional amount of the torsion bar 8, and a driver of the vehicle can recognize that the steered angle has reached the limit value.

Then, the clutch controller 90 acquires the steering angle θh calculated by the steering angle calculation unit 83 of the reactive-torque motor controller 70 (step S6), and determines whether or not a first condition expressed by Expression (1) is satisfied (step S7).

$$|\theta h| \geq |\theta hend + \alpha| \qquad \text{Expression (1)}$$

In Expression (1), |θh| is the absolute value of the steering angle θh acquired in step S6. θhend is the steering angle at the steered angle limit value stored in the storage unit in step S4. α is a first prescribed value that is greater than zero. |θhend+α| is the absolute value of a value obtained by adding the first prescribed value α to the steering angle θhend at the steered angle limit value.

When the clutch controller 90 determines that the first condition is not satisfied (step S7: NO), the clutch controller 90 determines whether or not the absolute value |θh| of the steering angle θh acquired in step S6 is smaller than the absolute value |θhend| of the steering angle at the steered angle limit value stored in the storage unit in step S4 (step S8). When the clutch controller 90 determines that the absolute value |θh| of the steering angle θh is equal to or greater than the absolute value |θhend| of the steering angle at the steered angle limit value (step S8: NO), the clutch controller 90 returns to step S6.

When the clutch controller 90 determines in step S8 that the absolute value |θh| of the steering angle θh is smaller than the absolute value |θhend| of the steering angle at the steered angle limit value (step S8: YES), the clutch controller 90 proceeds to step S9. In step S9, the clutch controller 90 controls the reactive-torque-side target steering angle setting unit 71 such that setting of the steering angle θhend as the reactive-torque-side target steering angle θhr* is cancelled and the steered-side target steering angle θht* is set as the reactive-torque-side target steering angle θhr*. The clutch controller 90 returns to step S1.

When the clutch controller 90 determines in step S7 that the first condition is satisfied (step S7: YES), the clutch controller 90 engages the clutch 6 (step S10). As a result, the steering shaft 5 (the steering wheel 2) and the steering operation mechanism 4 are connected to each other, so that the rack shaft 17 comes into contact with the rack stopper. Even when the clutch 6 is engaged, the steering operation motor controller 50 and the reactive-torque motor controller 70 continue the operation in the steer-by-wire mode because the clutch engagement state is a temporary state.

Then, the clutch controller 90 acquires the steering angle θh calculated by the steering angle calculation unit 83 of the reactive-torque motor controller 70 (step S11), and determines whether or not a second condition expressed by Expression (2) is satisfied (step S12).

$$|\theta h| \leq |\theta hend + \beta| \qquad \text{Expression (2)}$$

In Expression (2), |θh| is the absolute value of the steering angle θh acquired in step S11. θhend is the steering angle at the steered angle limit value stored in the storage unit in step S4. β is a second prescribed value, and is equal to or greater than zero and smaller than the first prescribed value α ($0 \leq \beta < \alpha$). |θhend+β| is the absolute value of a value obtained by adding the second prescribed value β to the steering angle θhend at the steered angle limit value.

When the clutch controller 90 determines that the second condition is not satisfied (step S12: NO), the clutch controller 90 returns to step S11 and executes the processes in step S11 and step S12 again. When the clutch controller 90 determines in step S12 that the second condition is satisfied (step S12: YES), the clutch controller 90 disengages the clutch 6 (step S13). As a result, the steering shaft 5 (the steering wheel 2) and the steering operation mechanism 4 are disconnected from each other. Then, the clutch controller 90 controls the reactive-torque-side target steering angle setting unit 71 such that setting of the steering angle θhend as the reactive-torque-side target steering angle θhr* is cancelled and the steered-side target steering angle θht* is set as the reactive-torque-side target steering angle θhr* (step S9). The clutch controller 90 returns to step S1.

In the foregoing embodiment, when the steered angle δ reaches the steered angle limit value, the steering angle θh is acquired. The acquired steering angle θh is stored in the storage unit as the steering angle θhend at the steered angle limit value (see S2, S3, and S4). The reactive-torque-side target steering angle setting unit 71 is controlled such that the steering angle θhend at the steered angle limit value is set as the reactive-torque-side target steering angle θhr* (see S5). After the steered angle δ reaches the steered angle limit value, when the absolute value |θh| of the steering angle θh does not become equal to or greater than the absolute value |θhend+α| of the value obtained by adding the first prescribed value α to the steering angle θhend at the steered angle limit value and becomes smaller than the absolute value |θhend| of the steering angle θhend at the steered angle limit value, the reactive-torque-side target steering angle setting unit 71 is controlled such that the steered-side target steering angle θht* is set as the reactive-torque-side target steering angle θhr*, and then the process returns to step S1 (see S6, S7, S8, and S9).

After the steered angle δ reaches the steered angle limit value, when the steering wheel 2 is rotated in a steering direction in which the steering angle increases against an operation reactive torque applied by the reactive-torque motor 14, and the absolute value |θh| of the steering angle θh becomes equal to or greater than the absolute value |θhend+α| of a value obtained by adding the first prescribed value α to the steering angle θhend at the steered angle limit value, the clutch 6 is engaged (see S7 and S10). Thus, the steering shaft 5 (the steering wheel 2) and the steering operation mechanism 4 are connected to each other and the rack shaft 17 comes into contact with the rack stopper. As a result, the rotation of the steering wheel 2 is suppressed.

Then, when the steering wheel 2 is rotated in a direction toward the neutral position and the absolute value |θh| of the steering angle θh becomes equal to or smaller than the absolute value |θhend+β| of a value obtained by adding the second prescribed value β to the steering angle θhend at the steered angle limit value, the clutch 6 is disengaged (see S12 and S13). The reactive-torque-side target steering angle setting unit 71 is controlled such that the steered-side target steering angle θht* is set as the reactive-torque-side target steering angle θhr*, and then the process returns to step S1 (see S9).

In the present embodiment, after the steered angle δ reaches the steered angle limit value, when the steering wheel 2 is rotated by an amount equal to or greater than the first prescribed value α in a steering direction in which the steering angle increases against an operation reactive torque applied by the reactive-torque motor 14, the clutch 6 is engaged. Therefore, the frequency with which the clutch 6 is engaged is lower than that in the related art described in JP 2001-171543 A in which the clutch 6 is engaged each time the rack shaft reaches the movable end. Thus, it is possible to reduce the frequency with which operating noise of the clutch is generated, and to increase the durability of the clutch.

While one embodiment of the invention has been described, the invention may be implemented in various other embodiments. For example, in the foregoing embodiment, the steering angle θh is calculated based on an output from the rotation angle sensor 15 configured to detect a rotation angle of the reactive-torque motor 14. However, as indicated by a chain line 11 in FIG. 1, a steering angle sensor configured to detect a rotation angle of the steering shaft 5 may be provided near the steering shaft 5, and a steering angle θh may be detected by the steering angle sensor. In this case, the steering angle calculation unit 83 of the reactive-torque motor controller 70 may be omitted.

In the foregoing embodiment, a steered angle δ is detected by the steered angle sensor 37. Alternatively, a steered angle δ may be calculated based on an output signal from the rotation angle sensor 36 configured to detect a rotation angle of the steering operation motor 31. In this case, the steered angle sensor 37 may be omitted.

What is claimed is:

1. A vehicle steering system comprising:
   a steering member configured to steer a vehicle;
   a steering operation mechanism configured to steer steered wheels;
   a clutch provided on a power transmission path extending from the steering member to the steered wheels;
   a reactive-torque motor connected to a portion of the power transmission path, the portion of the power transmission path being closer to the steering member than the clutch is, and the reactive-torque motor being configured to apply a steering reactive torque to the steering member;
   a steering operation motor connected to a portion of the power transmission path, the portion of the power transmission path being closer to the steered wheels than the clutch is, and the steering operation motor being configured to steer the steered wheels;
   a clutch controller configured to engage the clutch when a steered angle of the steered wheels has reached a steered angle limit value and the steering member is rotated by an amount equal to or greater than a first prescribed value in a direction opposite to a direction toward a steering neutral position, with respect to a first steering angle that is a steering angle of the steering member at a time when the steered angle reaches the steered angle limit value, in a case where the clutch is in a disengaged state; and
   a reactive torque motor controller configured to control the reactive-torque motor so that the rotation angle of the reactive-torque motor coincides with a first steering angle that is the steering angle corresponding to the steered angle limit value.

2. The vehicle steering system according to claim 1, further comprising:
   a steered angle acquiring unit configured to acquire the steered angle of the steered wheels; and
   a steering angle acquiring unit configured to acquire a steering angle of the steering member, wherein
   the clutch controller includes a first storage unit configured to store, as the first steering angle, an absolute value of the steering angle acquired by the steering angle acquiring unit when the steered angle acquired by the steered angle acquiring unit reaches the steered angle limit value; and
   the clutch controller is configured to engage the clutch when the absolute value of the steering angle acquired by the steering angle acquiring unit does not become smaller than the first steering angle and becomes equal to or greater than a value obtained by adding the first prescribed value to the first steering angle, after the steered angle acquired by the steered angle acquiring unit reaches the steered angle limit value.

3. The vehicle steering system according to claim 2, wherein:
   the clutch controller is configured to disengage the clutch when the absolute value of the steered angle acquired by the steered angle acquiring unit becomes equal to or smaller than an angle obtained by adding a second prescribed value to the absolute value of the first steering angle after the clutch is engaged by the clutch engagement controller, the second prescribed value being equal to or greater than zero and smaller than the first prescribed value.

4. A vehicle steering system comprising:
   a steering member configured to steer a vehicle;
   a steering operation mechanism configured to steer steered wheels;
   a clutch provided on a power transmission path extending from the steering member to the steered wheels;
   a reactive-torque motor connected to a portion of the power transmission path, the portion of the power transmission path being closer to the steering member than the clutch is, and the reactive-torque motor being configured to apply a steering reactive torque to the steering member;
   a steering operation motor connected to a portion of the power transmission path, the portion of the power transmission path being closer to the steered wheels than the clutch is, and the steering operation motor being configured to steer the steered wheels;
   at least one electronic control unit programmed to:
   engage the clutch when a steered angle of the steered wheels has reached a steered angle limit value and the steering member is rotated by an amount equal to or greater than a first prescribed value in a direction opposite to a direction toward a steering neutral position, with respect to a first steering angle that is a steering angle of the steering member at a time when the steered angle reaches the steered angle limit value, in a case where the clutch is in a disengaged state; and
   control the reactive-torque motor so that the rotation angle of the reactive-torque motor coincides with a first steering angle that is the steering angle corresponding to the steered angle limit value.

5. The vehicle steering system according to claim 4, wherein
the at least one electronic control unit is programmed to:
acquire the steered angle of the steered wheels; and
acquire a steering angle of the steering member.

6. The vehicle steering system according to claim 5, further comprising:
a memory storing, as the first steering angle, an absolute value of the acquired steering angle when the acquired steered angle reaches the steered angle limit value, wherein:
the at least one electronic control unit is programmed to:
engage the clutch when the absolute value of the acquired steering angle does not become smaller than the first steering angle and becomes equal to or greater than a value obtained by adding the first prescribed value to the first steering angle, after the acquired steered angle reaches the steered angle limit value.

7. The vehicle steering system according to claim 6, wherein:
the at least one electronic control unit is programmed to:
disengage the clutch when the absolute value of the acquired steered angle becomes equal to or smaller than an angle obtained by adding a second prescribed value to the absolute value of the first steering angle after the clutch is engaged, the second prescribed value being equal to or greater than zero and smaller than the first prescribed value.

* * * * *